United States Patent
Lee

(10) Patent No.: US 8,181,047 B2
(45) Date of Patent: May 15, 2012

(54) APPARATUS AND METHOD FOR CONTROLLING POWER MANAGEMENT BY COMPARING TICK IDLE TIME DATA TO POWER MANAGEMENT STATE RESUME TIME DATA

(75) Inventor: Jung Hwan Lee, Seongnam-si (KR)

(73) Assignee: LG Electronics Inc., Seoul (KR)

( * ) Notice: Subject to any disclaimer, the term of this patent is extended or adjusted under 35 U.S.C. 154(b) by 740 days.

(21) Appl. No.: 12/343,196

(22) Filed: Dec. 23, 2008

(65) Prior Publication Data

US 2009/0172428 A1 Jul. 2, 2009

(30) Foreign Application Priority Data

Dec. 26, 2007 (KR) .......................... 10-2007-0137336

(51) Int. Cl.
G06F 1/26 (2006.01)
G06F 1/32 (2006.01)

(52) U.S. Cl. ........................................................ 713/320

(58) Field of Classification Search .................... 713/320
See application file for complete search history.

(56) References Cited

U.S. PATENT DOCUMENTS

| 7,797,523 | B2 * | 9/2010 | Hobson et al. ..................... 713/1 |
| 2002/0026597 | A1 * | 2/2002 | Dai et al. ........................ 713/322 |
| 2003/0105983 | A1 * | 6/2003 | Brakmo et al. ................. 713/320 |
| 2006/0053326 | A1 * | 3/2006 | Naveh et al. ................... 713/323 |
| 2007/0005900 | A1 * | 1/2007 | Horrigan et al. ............... 711/135 |

* cited by examiner

*Primary Examiner* — Mohammed Rehman

(74) *Attorney, Agent, or Firm* — Birch, Stewart, Kolasch & Birch, LLP

(57) ABSTRACT

The present invention relates to an apparatus and a method for controlling power management based on information on ticks for performing program tasks and information on each of power management states, which is applicable to every apparatus and component able to enter a power saving state.

By means of entering a corresponding power management based on a result of comparing idle time of a processor during the tick with resume time of each power management state, power consumption can be reduced.

25 Claims, 7 Drawing Sheets

APPARATUS AND METHOD FOR CONTROLLING POWER MANAGEMENT BY COMPARING TICK IDLE TIME DATA TO POWER MANAGEMENT STATE RESUME TIME DATA

CROSS REFERENCE TO RELATED APPLICATIONS

The present application is related to, and claims priority to, Korean patent application No. 10-2007-0137336 filed on Dec. 26, 2007 in Republic of Korea, the entire contents of which are hereby incorporated by reference.

BACKGROUND OF THE INVENTION

1. Field of the Invention

The present invention relates to an apparatus and a method for controlling power management, which is applicable to every apparatus and component able to enter a power saving state.

2. Description of the Related Art

The present invention relates to an apparatus and a method in which a tick which is an performing cycle (or a scheduling cycle) of each task of programs is assigned by an operating system (hereinafter, 'OS') scheduler, so that a processor performs the each task during the assigned tick, wherein the apparatus and the method allow a processor to transition to a power saving state if workload given to the processor is less than a predetermined level and to transition to a corresponding power management state as compared operating time of the processor during the tick with resume time information of each power management state.

Hereinafter, related art of the present invention will be described.

In general, a system, a processor or a device is transitioned to a predetermined power management state if workloads given to the system, the processor or the device are less than a predetermined level.

For example, OS allows the processor (CPU) to enter a power saving state if no workload is given to the processor and to resume from the power saving state if the workload give to the processor is increased. Generally, the processor in hibernation state erases clock and cache data, so that resuming from the hibernation state takes a long time and more workload for resuming from the hibernation state is given to the processor. Accordingly, power consumption is increased.

SUMMARY OF THE INVENTION

It is an object of the present invention to provide an apparatus and a method for reducing power consumption by means of controlling power management. To achieve this and other advantages and in accordance with the object of the present invention, as embodied and broadly described herein, the present invention provides in one aspect a method of controlling power management comprising setting a plurality of power management states; setting a resume time of each of the power management states; setting a performing cycle of each of program tasks to be performed, based on a determination of a predetermined program; determining whether program tasks to be performed are generated during the previous tick; checking idle time of at least one tick passed if the program tasks to be performed are generated during the previous tick; comparing the idle time with the resume time of each of the power management states; and entering a corresponding power management state based on the comparing result.

In this case, the plurality of the power management state may include at least two states among processor state C0 to C6.

In addition, the resume time of each of the power management states may include time for flushing data from a L1 cache to a L2 cache in the processor core, for invalidating/disabling the L1 cache and for blocking power provided to the L1 cache when entering the each of the power management states, and time for enabling the L1 cache when resuming from the each of the power management states.

Also, the resume time of each of the power management states may include time for flushing data from a L1 cache to a L2 cache, for flushing data from the L2 cache to a L3 cache, for invalidating/disabling the L1 and L2 caches and for blocking power provided to the L1 and L2 caches when entering the each of the power management states, and time for enabling the L1 and L2 caches when resuming from the each of the power management states.

Further, the resume time of each of the power management states may include time for flushing data from a L1 cache to a L2 cache, for flushing data from the L2 cache to a L3 cache, for flushing data from the L3 cache to a RAM, for invalidating/disabling the L1, L2 and L3 caches and for blocking power provided to the L1, L2 and L3 caches when entering the each of the power management states, and time for enabling the L1, L2 and L3 caches when resuming from the each of the power management states.

Moreover, the higher the power management state level (C0→C6) is, the less number of caches may be operated.

Also, the higher the power management state level (C0→C6) is, memory units having the higher capacity only may be remained.

In this case, the memory units may be arranged as follows in order of capacity from smallest to largest.

$$L1 < L2 < L3 < RAM$$

In addition, the tick which is a performing cycle of each of program tasks may be normally generated by an OS (operating system) scheduler, or generated by timer interrupt generated based on predetermined commands.

Here, the idle time may be the rest time of at least one tick passed, excluding time using a processor.

In this case, the time using the processor during a tick may correspond to time of performing program tasks during a tick.

Further, the idle time during a tick may be calculated by following formula.

Idle time=scheduling cycle(time of a tick)*(1−time rate using the processor(%)/100)

Also, the idle time during a plurality of ticks may be calculated by following formula.

Average idle time=total time of a plurality of ticks* (1−average time rate using the processor(%)/ 100)/the number of ticks Moreover, the average time rate using the processor may be calculated by one program or by more than one different program.

In addition, whether the processor performs program tasks during each tick may be not considered when calculating the average idle time during a plurality of ticks.

Besides, only the ticks during which the processor performs program tasks may be using for calculating the average idle time during a plurality of ticks.

Furthermore, a power management state may be entered when the idle time is longer than a resume time of the power management state, in comparing the idle time with the resume time of each of the power management states.

In this case, a power management state may be entered when an average idle time is longer than a resume time of the power management state, in comparing the idle time with the resume time of each of the power management states.

In the meantime, the present invention provides in another aspect a method of controlling power management comprising setting a plurality of power management states; setting a resume time of each of the power management states; setting a performing cycle of each of program tasks to be performed, based on a determination of a predetermined program; determining whether program tasks to be performed are generated during the previous tick; determining whether the program tasks to be performed are generated periodically and checking idle time of at least one tick passed if the program tasks to be performed are generated during the previous tick; comparing the idle time with the resume time of each of the power management states; and entering a corresponding power management state based on determination whether the program tasks to be performed are generated periodically and on the comparing result.

In this case, a power management state which is one level lower than a power management state corresponding to a result of comparing idle time of at least one tick with the resume time of each of the power management states may be entered if the program tasks to be performed are generated periodically.

In the meantime, the present invention provides in another aspect an apparatus of controlling power management comprising a processor; a memory unit configured to store a program assigning performing cycles to program tasks to be performed and information of resume time of each of power management states; and a control unit configured to connect with the processor and to allow to enter a corresponding power management state based on a result of comparing idle time of the performing cycle with the resume time of each of the power management states.

In this case, the memory unit may store an OS (operating system) scheduler assigning ticks which correspond to performing cycles of program tasks to be performed or at least another application programs.

In addition, the idle time may be calculated by at least one program.

Also, the idle time may be calculated with at least one idle.

In this case, the control unit may be configured to allow to enter a corresponding power management state based on a result of comparing the idle time of at least one performing cycle with the resume time of each of the power management states, and determination of whether the program tasks to be performed are periodically generated.

As described above in detail, in the apparatus and the method for controlling power management, the following advantages can be expected.

That is, since the power management is controlled by means of comparing idle time of at least one tick with resume time of each of the power management states, it is advantageous in that power consumption can be reduced.

In addition, in the apparatus and the method for controlling power management according to the present invention, since in a case where no task is generated during a tick, a corresponding power management state which is selected by comparing idle time of the tick with the resume time is not entered, and in a case where a program to be performed periodically generates tasks, a power management state which is one level lower than the corresponding power management state is entered, it is advantageous in that more efficient power management can be possible.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE INVENTION

Figure 1:
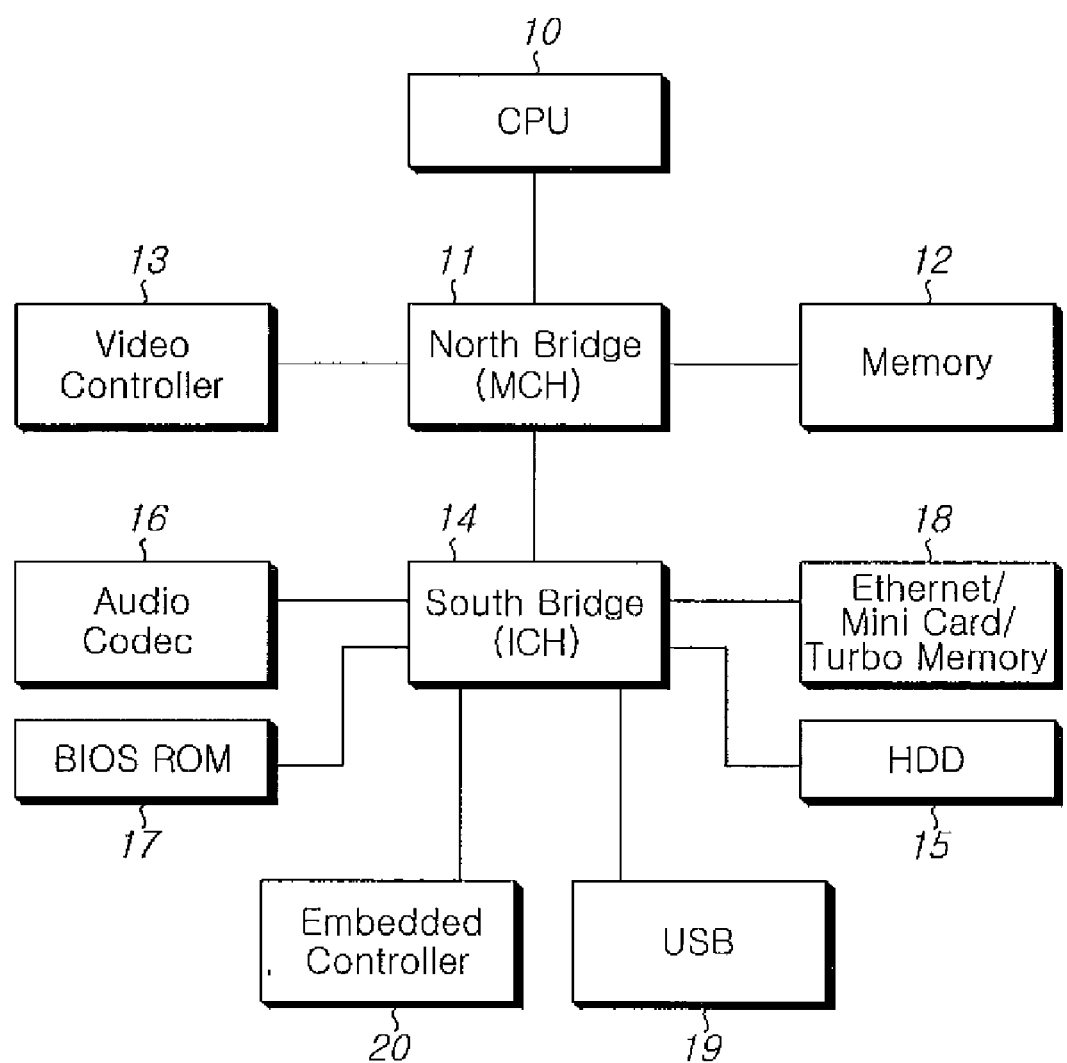
FIG. 1 is a block diagram showing the configuration of system provided with a hard disk drive (HDD) storing an operation system (OS) and a central processing unit (CPU) including at least one processor core.

Reference will now be made in detail to the preferred embodiments of the present invention, examples of which are illustrated in the accompanying drawings.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

Hereinafter, an apparatus of controlling power management according to an embodiment of the present invention will be described in detail with reference to the accompanying drawings.

First, each of power management states and each of the resume time of processors are defined as follows as an example. The resume time corresponds to time spent from the moment entering a power management state to the moment resuming from the power management state.

TABLE 1

| Power Management State | Description | Resume time |
| --- | --- | --- |
| C0 | Full ON | 10 ms |
| C1 | Auto Halt | 20 ms |
| C2 | Stop Grant. Clock stopped to processor core. | 150 ms |
| C3 | Deep Sleep. Clock to processor stopped. Data stored in L1 cache is flushed to L2 cache. | 250 ms |
| C4 | Deeper Sleep. Data stored in L1 Cache and L2 Cache is flushed to L3 cache. L1/L2 caches are invalidated/disable. Power to L1/L2 caches is blocked. | 350 ms |
| C5/C6 | Enhanced Deeper Sleep. Data stored in L1/L2/L3 Caches is flushed to RAM. L1/L2/L3 caches are invalidated/disable. Power to L1/L2/L3 caches is blocked. | 400 ms |

Here, a case where at least one core in a processor is existed will be described.

1. Core C3: Every clock to the cores of the processor is stopped. Data stored in L1 cache is flushed to L2 cache. That is, the data stored in the L1 cache is stored on the L2 cache. In this case, the L1 cache is invalidated and disabled. Also, power provided to the L1 cache is blocked.

2. Core C4: If all cores of the processor enter C4 state, every core enters a deeper sleep package low-power state. Data stored in the L1 cache is flushed to the L2 cache. Data stored in the L2 cache is flushed to L3 cache. In this case, the L1/L2 caches are invalidated and disabled. Also, power provided to the L1/L2 caches is blocked. Accordingly, voltage applied to the processor is decreased.

3. Core C5/C6: Processor contexts are stored to (S)RAM. In this case, data stored in the L1/L2/L3 caches is flushed to the RAM. The L1/L2/L3 caches are invalidated and disabled. Also, power provided to the L1/L2/L3 caches is blocked.

Here, resume time of each of the power management state is an example in a case where a tick is 500 ms.

As another example, the power management states may be classified as one of a maximum power mode, a nap power mode, and a deep nap power mode according to operating frequencies and operating voltages of processors.

Meanwhile, embodiments of the present invention will be described around power management for processors (CPUs) however, the essential characteristics or the present invention can be applied to power management for other systems or devices which need power management.

An embodiment of the present invention suggests that ticks which correspond to a performing cycle are assigned to each task of a program to be performed, and a processor performs each task during the assigned tick.

Another embodiment of the present invention suggests that a power management state is entered if no workload is given to the processor during the assigned tick and a corresponding power management state is entered based on a result of comparing information of performance of the processor during the previous ticks with a resume time of each of the power management state.

Another embodiment of the present invention suggests to use idle time information which corresponds to rest time of ticks excluding time using the processor, as the information of performance of the processor during the previous ticks.

Another embodiment of the present invention suggests to use information of the time using the processor, as the information of performance of the processor during the previous ticks.

Another embodiment of the present invention suggests that a power management state which is lower level than a corresponding power management state selected by comparing the idle time with each resume time of every power management state is entered if a program to be performed generates periodical tasks in a case where no workload is given to the processor.

Another embodiment of the present invention suggests that the higher the power management state level (C0→C6) is, the less number of caches are operated and memory units having the higher capacity only are remained.

FIG. 1 is a block diagram showing the configuration of system provided with a hard disk drive (HDD) storing an operation system (OS) and a central processing unit (CPU) including at least one processor core.

As shown in FIG. 1, the apparatus according to an embodiment of the present invention comprises a processor 10 which corresponds to a central processing unit (CPU), a north bridge 11 controlling a video controller 13 connected to the CPU and processing video signals and a system memory 12 (for example, a RAM), a south bridge 14 controlling peripherals such as a HDD (Hard Disk Drive) 15, an audio codec 16, BIOS ROM 17 and an Ethernet/Mini-card 18, USBs (Universal Serial Buses) 19 and an embedded controller 20 controlling input units such as a keyboard or a mouse.

In the above, the north bridge 11 and the south bridge 14 may be composed as one unit and the components included in the apparatus are linked to each other by PCI or PCI-E.

The HDD 15 stores an OS scheduler for assigning performing cycles to tasks of programs to be performed or/and an application program for generating timer interrupts. Also, resume time information of each of the power management states for the processor may be stored on the HDD 15 or one of the other storage units.

Figure 2:
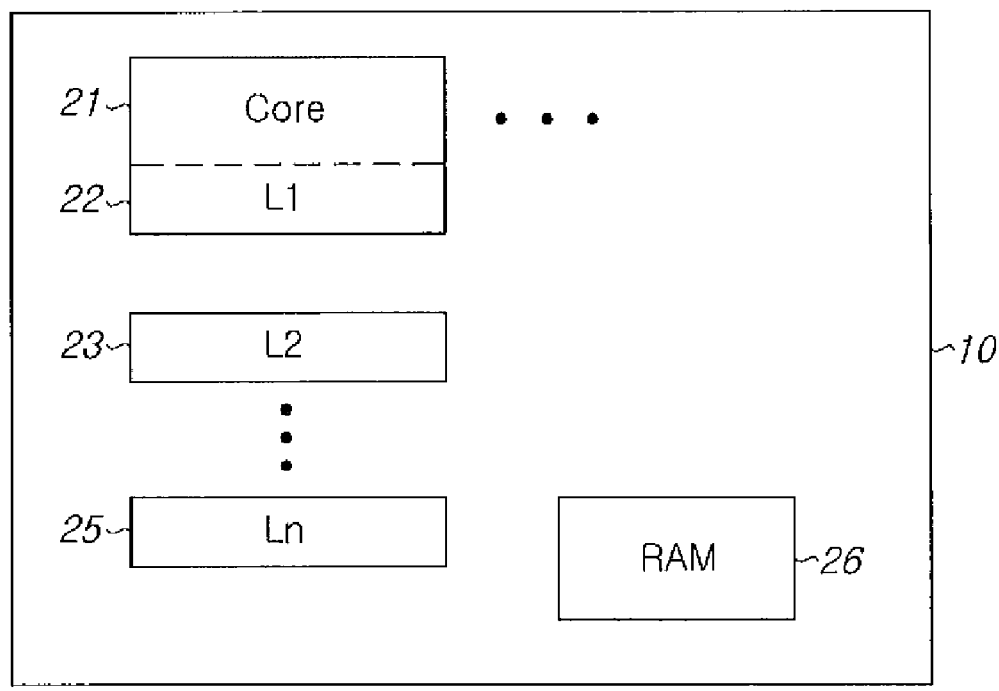
FIG. 2 is a block diagram showing the configuration of processor cores and cache memories according to an embodiment of the present invention.

FIG. 2 is a block diagram showing the configuration of processor cores and cache memories according to an embodiment of the present invention.

As shown in FIG. 2, the processor 10 comprises single core 21 and at least one cache memory L1 22, L2 23, ..., Ln 25. In addition, a (S)RAM 26 is provided in the processor 10. FIG. 2 is showing an embodiment in which the L1 22 is provided in the core 21.

Figure 3:
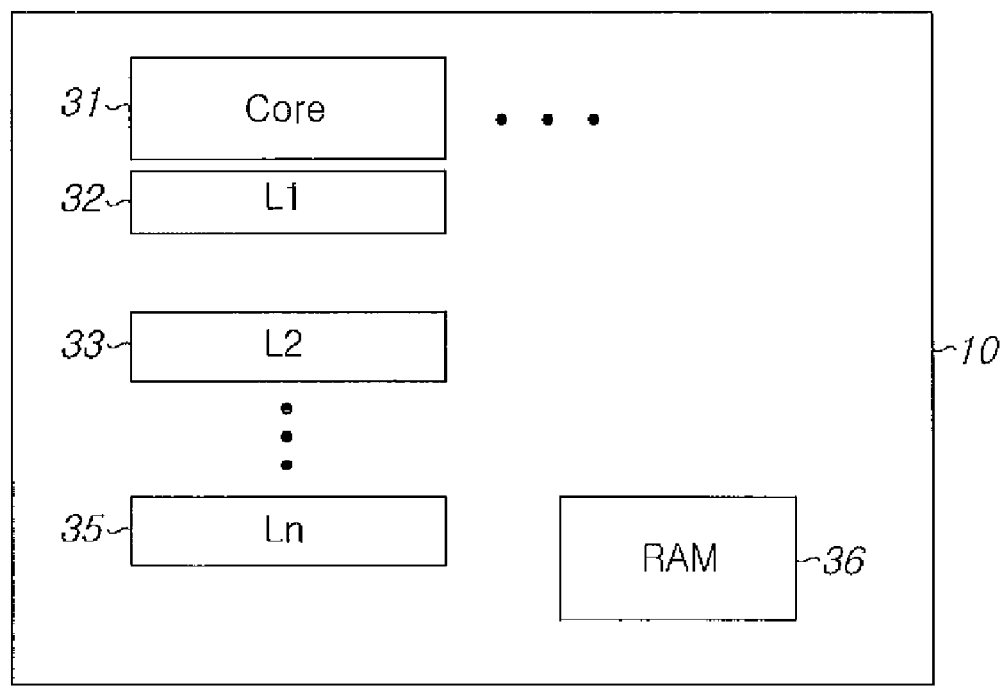
FIG. 3 is a block diagram showing the configuration of processor cores and cache memories according to another embodiment of the present invention.

FIG. 3 is a block diagram showing the configuration of processor cores and cache memories according to another embodiment of the present invention.

As shown in FIG. 3, the processor 10 comprises single core 31 and at least one cache memory L1 32, L2 33, ..., Ln 35. In addition, a (S)RAM 36 is provided in the processor 10. That is, FIG. 3 is showing another embodiment in which the L1 32 is provided out of the core 31.

Figure 4:
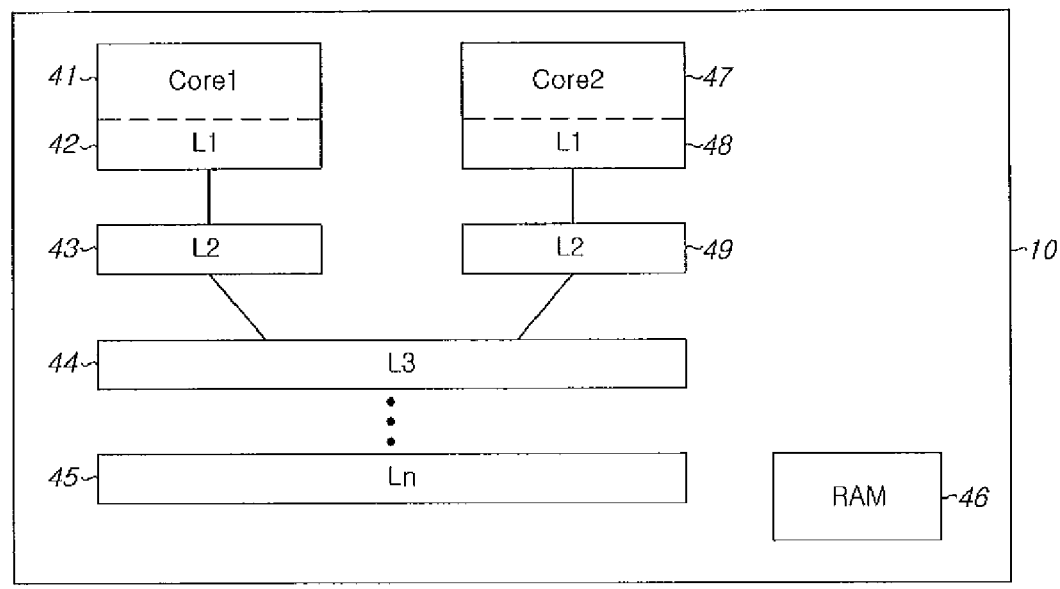
FIG. 4 is a block diagram showing the configuration of processor cores and cache memories according to another embodiment of the present invention.

FIG. 4 is a block diagram showing the configuration of processor cores and cache memories according to another embodiment of the present invention.

As shown in FIG. 4, the processor 10 comprises a plurality of cores, for example a first core 41 and a second core 47, and at least one cache memory L1 42 and 48, L2 43 and 49, L3 44, ..., Ln 45. In addition, a (S)RAM 46 is provided in the processor 10. In the above, the L1 42 and 48 is illustrated as being provided in the cores 31 and 47, however the L1 42 and 48 may be provided on the interior or the exterior of the cores 42 and 48.

Figure 5A:
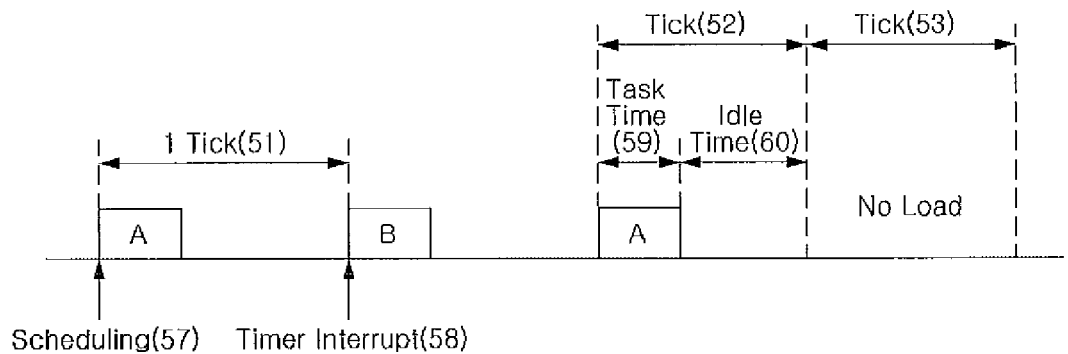
FIG. 5a is an illustration showing that OS scheduler stored in HDD assigns ticks which are scheduling cycles to each of tasks of programs to be performed and that processors process the each of tasks during assigned ticks.

FIG. 5a is an illustration showing that OS scheduler stored in HDD assigns ticks which are scheduling cycles to each of tasks of programs to be performed and that processors process the each of tasks during assigned ticks.

Figure 5B:
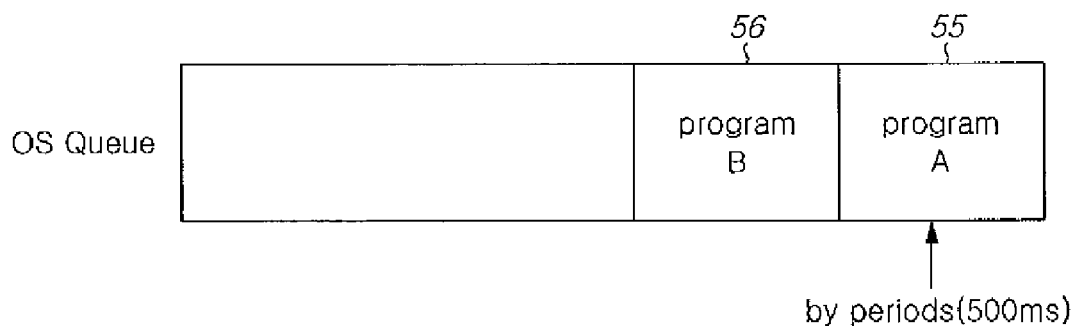
FIG. 5b is an illustration showing an OS queue which includes information of programs to be performed (Program A (55), Program B (56)).

FIG. 5b is an illustration showing an OS queue which includes information of programs to be performed (Program A (55), Program B (56)).

As shown in figures, ticks 51 and 52 is assigned to each task of a program A 55 based on a scheduling 57 regarding the program A 55 and the tasks are performed by a predetermined performing cycle (for example, 500 ms).

In the meantime, if a timer interrupt 58 is generated by a predetermined application program while performing the program A 55, another program B 56 can be performed.

Then, a task of the program A 55 is performed during the tick 52 assigned to tasks of the program A 55, and a power saving function is executed during idle time 59 of the tick 52. After then, the processor 10 enters a corresponding power management state by means of comparing idle time 60 of at least one previous tick with resume time of each of the power management states, during the next tick.

Hereinafter, the process of controlling power management according to an embodiment of the present invention will be described in detail with reference to the accompanying drawings.

First, the spirit or essential characteristics of the present invention will be overviewed briefly.

In a case where ticks which correspond to a performing cycle are assigned to each task of a program to be performed and a processor performs each task during the assigned tick, the apparatus and the method according to an embodiment of the present invention allow to enter a power management state when no load is given to the processor. Basically, the following three cases will be described as examples, but it should be understood that the present invention is not limited by the following cases.

The OS scheduler is a program adjusting the schedule and sequence for allowing each processor or each core to share system resources. Kernels which are central parts managing total OS services in the OS, assign ticks to each task. This role of the kernels is called a scheduling.

The ticks may be generated by program performances or by predetermined commands such as a timer interrupt.

1) In a first embodiment of the present invention, the processor enters to a corresponding power management state selected by means of comparing idle time of a previous tick prior to performing a program A which is presently performing with each resume time of each power management state. In this case, if the idle time is longer, by a predetermined difference, than a resume time of a power management state, the processor may enter to the power management state. Here, the difference may be determined considering efficiency of system works and power management.

The processor may enter to a power management state which substantially provides better effect in power saving, by means of comparing the idle time with each resume time of each power management state, only when a program to be performed generates periodical tasks.

In the above, the programs which generate periodical tasks are such as movie players, audio players and game programs.

The pre-mentioned power management method (a method of entering a power management state determined by comparing the idle time with each resume time) is applicable to the other power management embodiments of the present invention.

The idle time corresponds to the rest time of a scheduling cycle (hereinafter, 'a tick', for example, a tick may be 1,000 ms) excluding time using the processor. The idle time may be calculated by the following formula.

$$\text{Idle time} = \text{a scheduling cycle (a tick)} * (1 - \text{time rate using the processor}(\%)/100) \quad \text{[FORMULA 1]}$$

In the above, the time rate using the processor may be checked by the processor.

The processor enters a corresponding power management state determined by the following formula.

$$\text{Idle time} > \text{resume time of each power management state} \quad \text{[FORMULA 2]}$$

In the above, the resume time of every power management state (for example, C0 to C6) is determined by factors such as time for flushing data in L1 cache to L2 cache and time for invalidating/disabling the L1 cache and blocking power to the L1 cache when entering a power management state and time for enabling the L1 cache when resuming from the entered power management state, or time for flushing data in L1 cache to L2 cache, time for flushing data in the L2 cache to L3 cache, time for invalidating/disabling the L1/L2 caches and block power to the L1/L2 caches when entering a power management state and time for enabling the L1/L2 caches when resuming from the entered power management state) and so on). The factors such as above are applicable to determine the resume time in the other embodiments of the present invention.

2) And second, in another embodiment of the present invention, the processor enters to a corresponding power management state selected by means of comparing average idle time of a plurality of previous ticks (for example, a plurality of scheduling cycles for at least one program) prior to performing a program A which is presently performing with each resume time of each power management state.

$$\text{Average idle time} = \text{total time of a plurality of ticks} * (1 - \text{average time rate using the processor}(\%)/100)/\text{the number of ticks} \quad \text{[FORMULA 3]}$$

In the above, in calculating the average idle time of a plurality of previous ticks, the processor may select ticks by a predetermined number without regard to whether tasks were performed in each of the previous ticks or select only the ticks in which at least a task was performed.

The tasks performed in the ticks may be generated by a program or by at least two different programs.

$$\text{Average idle time} > \text{resume time of each power management state} \quad \text{[FORMULA 4]}$$

3) Third, in another embodiment of the present invention, the processor enters a power management state which is at least one level lower than a power management state which is a state of the highest level determined by OS to be enterable, during idle time in which no workload is given to the processor, if the program tasks to be performed are generated periodically. That is, the processor disables the highest level power management states determined to be enterable in order to entering a power management state which is at least one level lower than the power management states determined to be enterable.

The highest level power management state is predetermined by users on a user interface provided by OS, or determined by comparing the idle time with resume time of each power management state.

In determining whether a program to be performed generates periodical tasks, information on properties of each program, stored in memory or information on tasks already performed during previous ticks is considered as factors in the determination. Also, other factors may be considered.

In this case, the higher level a power management state is (C0→C6), the less number of caches are operated. Accordingly, the power consumed by the cores gets less. Meanwhile, the higher the power management state level is (C0→C6), the higher capacity memory units are remained (the memory units are arranged as 1<L2<L3<RAM in order of capacity from smallest to largest.

Figure 6:
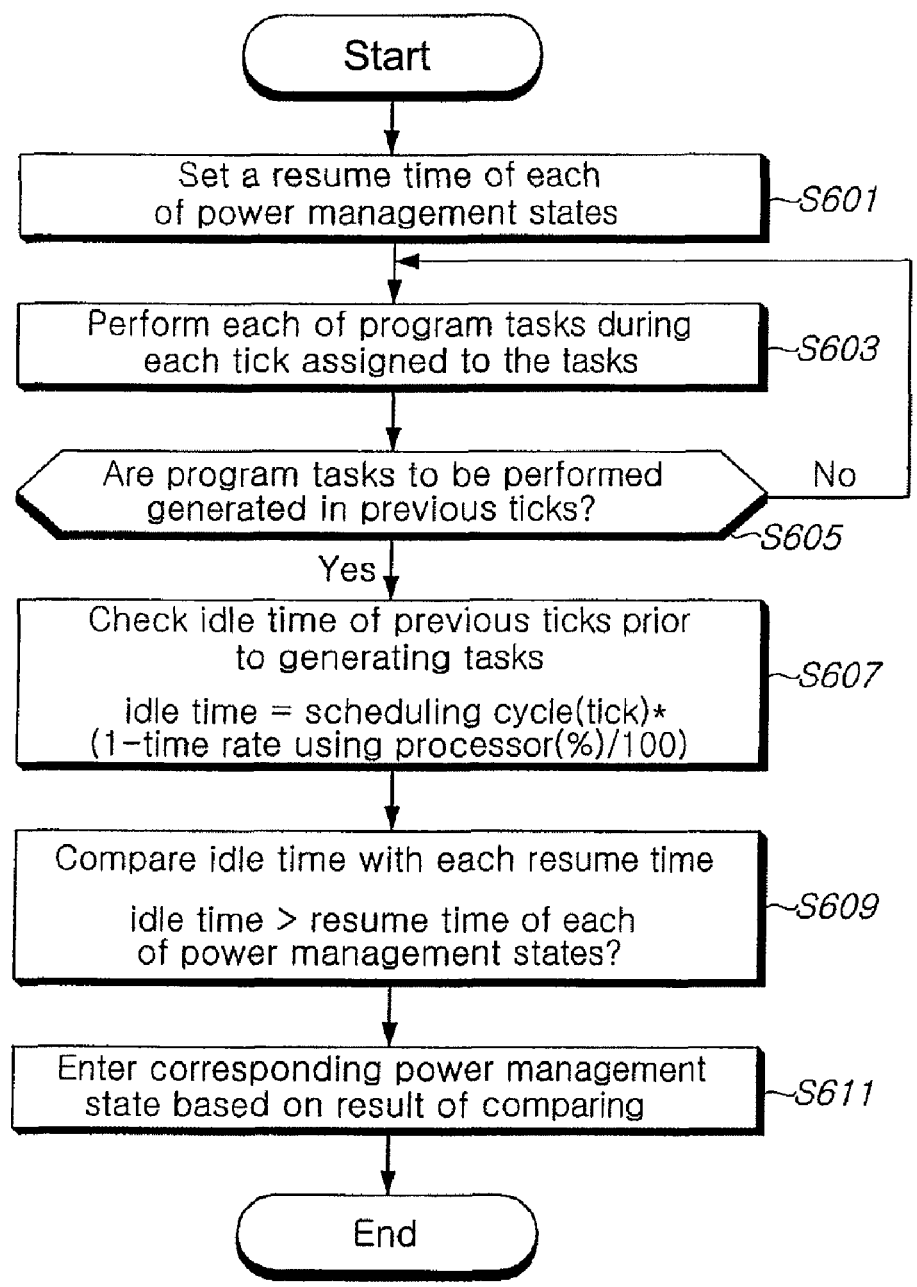
FIG. 6 is a flow chart showing a process of controlling power management states using idle time of a tick.

FIG. 6 is a flow chart showing a process of controlling power management states using idle time of a tick.

As an embodiment, as shown in TABLE 1, resume time of each of a plurality of power management states (C0 to C6) is set up (S601).

As shown in FIG. 5*a*, ticks are assigned to each task of programs by an OS scheduler and the processor performs each task during the assigned tick to the each task (S603).

The processor checks whether tasks of the same program as the program generating tasks to be performed are generated during a previous tick such as the tick 52 in FIG. 5*a* (S605).

If at least one task of the same program is generated during a previous tick, idle time of the previous tick in which at least a task of the same program as the program to be performed is generated is calculated by the FORMULA 1 (S607).

The calculated idle time is compared with predetermined resume times shown in TABLE 1, according to the FORMULA 2 (S609).

Consequently, the processor enters a corresponding power management state determined based on the result of comparing (S611).

Figure 7:
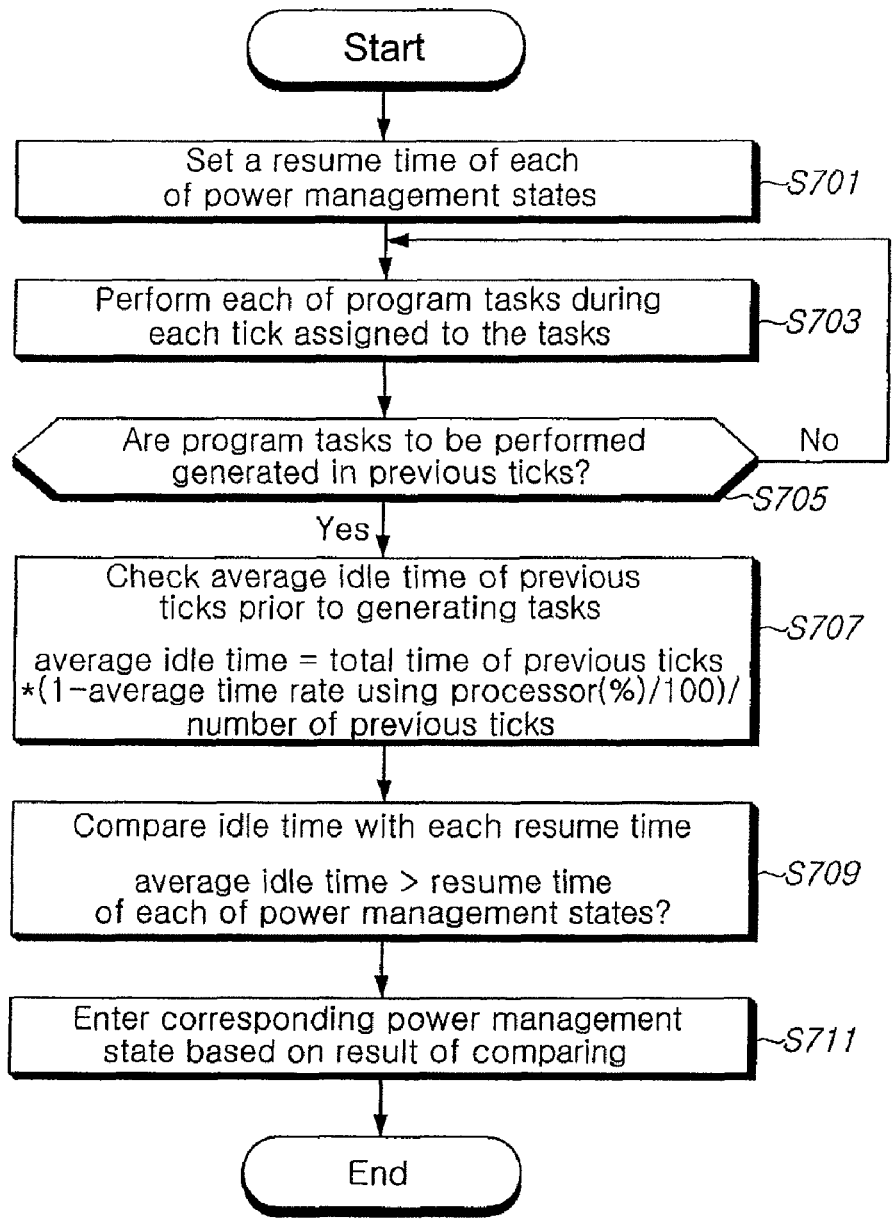
FIG. 7 is a flow chart showing a process of controlling power management states using idle time of a plurality of ticks.

FIG. 7 is a flow chart showing a process of controlling power management states using idle time of a plurality of ticks.

The difference of the embodiment to be described with reference to FIG. 7 from the embodiment illustrated by FIG. 6 is that the processor calculates an average idle time of previous ticks of a tick 52 by the FORMULA 3 (S707).

Then, the average idle time is compared with resume time of each power management state, predetermined as shown in TABLE 1 by the FORMULA 4 (S709).

The processor enters a corresponding power management state selected based on the result of comparing (S711).

Figure 8:
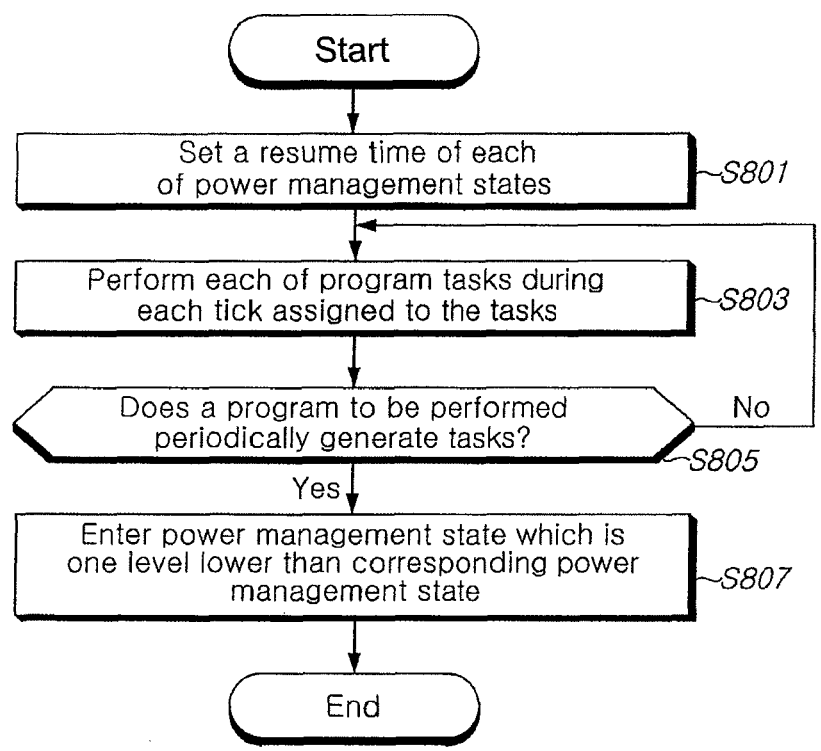
FIG. 8 is a flow chart showing a process of controlling power management states using idle time of a tick by means of determining whether a program being performed generates tasks periodically.

FIG. 8 is a flow chart showing a process of controlling power management states using idle time of a tick by means of determining whether a program being performed generates tasks periodically.

The processor checks the highest level power management state which is predetermined to be enterable by the OS (S805) and then, enters a power management state which is at least one lever lower than the highest level power management state to be enterable (S809).

The scope of the present invention is not limited to the embodiments described above but is defined by the appended claims. It will be apparent that those skilled in the art can make various modifications and changes thereto within the scope of the invention defined by the claims.

What is claimed is:

1. A method of controlling power management, the method comprising:
setting a plurality of power management states;
setting a resume time of each of the power management states, wherein the resume time is a time from the moment entering a power management state to the moment resuming from the power management state;
setting a tick which is a performing cycle of each of program tasks to be performed, based on a determination of a predetermined program;
determining whether program tasks to be performed are generated during a previous tick;
checking idle time of at least one tick passed if the program tasks to be performed are generated during the previous tick;
comparing the idle time with the resume time of each of the power management states; and
entering a corresponding power management state based on the comparing result.

2. The method as claimed in claim 1, wherein the plurality of the power management states include at least two states among processor state CO to C6.

3. The method as claimed in claim 1, wherein the resume time of each of the power management states includes time for:
flushing data from an L1 cache to an L2 cache in the processor core, invalidating/disabling the L1 cache, blocking power provided to the L1 cache when entering the each of the power management states, and enabling the L1 cache when resuming from the each of the power management states.

4. The method as claimed in claim 1, wherein the resume time of each of the power management states includes time for:
flushing data from an L1 cache to an L2 cache, flushing data from the L2 cache to an L3 cache, invalidating/disabling the L1 and L2 caches, blocking power provided to the L1 and L2 caches when entering the each of the power management states, and enabling the L1 and L2 caches when resuming from the each of the power management states.

5. The method as claimed in claim 1, wherein the resume time of each of the power management states includes time for:
flushing data from an L1 cache to an L2 cache, flushing data from the L2 cache to an L3 cache, flushing data from the L3 cache to a RAM, invalidating/disabling the L1, L2 and L3 caches, blocking power provided to the L1, L2 and L3 caches when entering the each of the power management states, and enabling the L1, L2 and L3 caches when resuming from the each of the power management states.

6. The method as claimed in claim 5, wherein the higher the power management state is, the fewer the number of caches that are operated.

7. The method as claimed in claim 5, wherein the higher the power management state is, the fewer the number of memory units remain, and
wherein the remaining memory units have higher capacity than those which are disabled.

8. The method as claimed in claim 7, wherein the memory units are arranged in order of capacity from smallest to largest, where:

$$L1<L2<L3<RAM.$$

9. The method as claimed in claim 1, wherein the tick which is a performing cycle of each of program tasks is generated by an OS (operating system) scheduler, or by a timer interrupt that is based on predetermined commands.

10. The method as claimed in claim 1, wherein the idle time is the rest time of at least one tick passed, excluding time using a processor.

11. The method as claimed in claim 10, wherein the time using the processor during a tick corresponds to a time of performing program tasks during a tick.

12. The method as claimed in claim 10, wherein the idle time during a tick is calculated by:

Idle time=a scheduling cycle(a tick)*(1−time rate using the processor(%)/100).

13. The method as claimed in claim 10, wherein the idle time during a plurality of ticks is calculated by:

Average idle time=total time of a plurality of ticks* (1−average time rate using the processor(%)/ 100)/the number of ticks.

14. The method as claimed in claim 13, wherein the average time rate using the processor is calculated by one or more programs.

15. The method as claimed in claim 13, wherein whether the processor performs program tasks during each tick is not considered when calculating the average idle time during a plurality of ticks.

16. The method as claimed in claim 13, wherein only the ticks during which the processor performs program tasks are used for calculating the average idle time during a plurality of ticks.

17. The method as claimed in claim 1, wherein a power management state is entered when it is determined that the idle time is longer than a resume time of the power management state, by comparing the idle time with the resume time of each of the power management states.

18. The method as claimed in claim 1, wherein a power management state is entered when it is determined that an average idle time is longer than a resume time of the power management state, by comparing the idle time with the resume time of each of the power management states.

19. A method of controlling power management, the method comprising:
  setting a plurality of power management states;
  setting a resume time of each of the power management states, wherein the resume time is a time from the moment entering a power management state to the moment resuming from the power management state;
  setting a tick which a performing cycle of each of program tasks to be performed, based on a determination of a predetermined program;
  determining whether program tasks to be performed are generated during a previous tick;
  determining whether the program tasks to be performed are generated periodically and checking idle time of at least one tick passed if the program tasks to be performed are generated during the previous tick;
  comparing the idle time with the resume time of each of the power management states; and
  entering a corresponding power management state based on determination whether the program tasks to be performed are generated periodically and on the comparing result.

20. The method as claimed in claim 19, wherein a power management state, which is one level lower than a power management state corresponding to a result of comparing idle time of at least one tick with the resume time of each of the power management states, is entered if the program tasks to be performed are generated periodically.

21. An apparatus for controlling power management comprising:
  a processor;
  a memory unit configured to store a program assigning ticks which are performing cycles to program tasks to be performed, and information of a resume time of each of power management states; and
  a control unit configured to collaborate with the processor to allow entry of a corresponding power management state based on a result of comparing an idle time of a performing cycle with the resume time of each of the power management states,
  wherein the resume time is a time from the moment entering a power management state to the moment resuming from the power management state, and
  wherein the comparison further comprises determining whether the program tasks to be performed are generated during a previous tick, and checking an idle time of at least one tick passed if the program tasks to be performed are generated during a previous tick.

22. The apparatus as claimed in claim 21, wherein the memory unit stores an OS (operating system) scheduler assigning ticks which correspond to performing cycles of program tasks to be performed or at least another application programs.

23. The apparatus as claimed in claim 21, wherein the idle time is calculated by at least one program.

24. The apparatus as claimed in claim 21, wherein the idle time is calculated with at least one idle.

25. The apparatus as claimed in claim 21, wherein the control unit is configured to allow entry of a corresponding power management state based on a result of comparing the idle time of at least one performing cycle with the resume time of each of the power management states, and to determine whether the program tasks to be performed are periodically generated.

* * * * *